United States Patent
Chang et al.

(10) Patent No.: US 10,657,369 B1
(45) Date of Patent: May 19, 2020

(54) UNSUPERVISED REMOVAL OF TEXT FROM IMAGES USING LINEAR PROGRAMMING FOR OPTIMAL FILTER DESIGN

(71) Applicant: INTUIT INC., Mountain View, CA (US)

(72) Inventors: Diane Chang, Mountain View, CA (US); Rohan Kekatpure, Sunnyvale, CA (US)

(73) Assignee: INTUIT, INC., Mountain View, CA (US)

( * ) Notice: Subject to any disclaimer, the term of this patent is extended or adjusted under 35 U.S.C. 154(b) by 250 days.

(21) Appl. No.: 15/796,678

(22) Filed: Oct. 27, 2017

(51) Int. Cl.
*G06K 9/62* (2006.01)
*G06K 9/00* (2006.01)
*G06T 5/10* (2006.01)

(52) U.S. Cl.
CPC ............ *G06K 9/00483* (2013.01); *G06T 5/10* (2013.01); *G06T 2207/10004* (2013.01); *G06T 2207/20056* (2013.01)

(58) Field of Classification Search
CPC .................. G06K 9/00483; G06T 5/10; G06T 2207/20056; G06T 2207/10004
See application file for complete search history.

(56) References Cited

U.S. PATENT DOCUMENTS

| | | | | |
|---|---|---|---|---|
| 9,231,608 B1 * | 1/2016 | Pupalaikis | .......... | H03M 1/1038 |
| 9,959,247 B1 * | 5/2018 | Woo | .................... | G06F 9/30032 |
| 2011/0142348 A1 * | 6/2011 | Radhakrishnan | .. | G06K 9/00744 |
| | | | | 382/195 |
| 2015/0178591 A1 * | 6/2015 | Fergus | .................... | G06T 5/005 |
| | | | | 382/157 |
| 2017/0086678 A1 * | 3/2017 | Oishi | ..................... | G01N 29/12 |
| 2019/0099162 A1 * | 4/2019 | Keshet | ................. | A61B 8/5223 |

* cited by examiner

*Primary Examiner* — Solomon G Bezuayehu
(74) *Attorney, Agent, or Firm* — Patterson + Sheridan, LLP

(57) ABSTRACT

Techniques are disclosed for removing text from an image of a form document. The text is removed by determining a spectral domain representation of the image and applying a filter to remove the high-frequency components which correspond to the text in the form. An image is reconstructed from the filtered spectral domain representation which maintains the low-frequency components, while deemphasizing or removing the high-frequency components. A shape of the filter applied to the spectral domain representation is determined based on a similarity measure between the image of the form and the reconstructed image.

20 Claims, 8 Drawing Sheets

UNSUPERVISED REMOVAL OF TEXT FROM IMAGES USING LINEAR PROGRAMMING FOR OPTIMAL FILTER DESIGN

BACKGROUND

Field

Embodiments presented herein generally relate to software applications that detect and remove data from images. More specifically, embodiments herein relate to generating an accurate reconstruction of an image while removing or deemphasizing high spectral frequency data from the reconstructed image.

Description of the Related Art

Images of documents and text are increasingly common due to the ease of creating digital images. For example, an image of a completed form document is generated when an existing paper record is scanned. An image is also generated when an individual captures a digital image of a paper record in their possession. For example, users of tax or accounting software applications (or online applications) can generate an image of a form by capturing a picture of a document, such as a W-2, with a digital camera or a digital scanning device. An image of a form document depicts information in that document using an image format, e.g., an array of pixel color values.

Various form documents may contain the same or similar data. However, a given form document may have multiple layouts in which that data is presented on the form. That is, a form document may include information related to a specific individual, but no standardization of that form requires the information to be located in a particular area on the form document. For example, many W-2 forms include a field for an employee's name and address, the employee's social security number, an employer's name and address, wages paid to the employee, and federal income tax withheld. However, a location of this information in a form document may differ from one W-2 layout to another. The various layouts of a given form document increase the complexity of extracting text from that form document because specific information, e.g., the employee's social security number, may be in a different location of the form on each form document.

One approach to extract data from an image of a form document is to classify the image using supervised learning (e.g. neural networks), and then extract the data from the form using optical character recognition (OCR) over regions of the image. The supervised machine learning algorithms currently used to identify a given form require significant amounts of training data to accurately classify a form document. Generating the training data set for a supervised learning is time intensive, costly, and presents a security risk when images of form documents contain sensitive personal information. For example, training a supervised learning algorithm to identify W-2 forms issued by a variety of employers could expose sensitive personal information in the forms to human reviewers who classify the forms for the training set.

Once a form document is classified, the ability to extract and classify text depends on a layout of that form. That is, accuracy of an OCR process to classify text increases if a location of the text within the form document is known. However, current techniques to extract text from a form typically analyze the entire form document, including both layout and content elements, which increases the error rate of the extracted data. High error rates in the accuracy of the extracted data require extensive quality control by human reviewers, or in some cases, may make the automatic extraction of the data values commercially impractical.

SUMMARY

One embodiment of the present disclosure includes a method for removing text from an image of a form. The method generally includes generating a matrix representing pixels of an image, wherein the image depicts at least a portion of a form, and wherein the form includes layout elements and content elements. The method also includes applying a matrix flattening operation to the matrix and generating a frequency domain representation of the image by applying a frequency domain transformation to the flattened matrix. The method also includes generating a filter to apply to the frequency domain representation. The method also includes applying the filter to the frequency domain representation to remove a portion of the frequency domain representation of the image. The method also includes generating a reconstructed matrix from the filtered frequency domain representation, wherein a format of the reconstructed matrix is a format of the matrix representing pixels of the image. The method also includes generating a reconstructed image of at least the portion of the form by applying an inverse frequency domain transformation to the reconstructed matrix filtered frequency domain representation, wherein the reconstructed image depicts only a portion of the content elements.

Another embodiment provides a computer-readable medium storing instructions, which, when executed by one or more processors, perform an operation for removing text from an image of a form. The operation generally includes generating a matrix representing pixels of an image, wherein the image depicts at least a portion of a form, and wherein the form includes layout elements and content elements. The operation also includes applying a matrix flattening operation to the matrix and generating a frequency domain representation of the image by applying a frequency domain transformation to the flattened matrix. The operation also includes generating a filter to apply to the frequency domain representation. The operation also includes applying the filter to the frequency domain representation to remove a portion of the frequency domain representation of the image. The operation also includes generating a reconstructed matrix from the filtered frequency domain representation, wherein a format of the reconstructed matrix is a format of the matrix representing pixels of the image. The operation also includes generating a reconstructed image of at least the portion of the form by applying an inverse frequency domain transformation to the reconstructed matrix filtered frequency domain representation, wherein the reconstructed image depicts only a portion of the content elements.

Still another embodiment includes a processor and a memory hosting an application, which, when executed on the processor, performs an operation for removing text from an image of a form. The operation generally includes generating a matrix representing pixels of an image, wherein the image depicts at least a portion of a form, and wherein the form includes layout elements and content elements. The operation also includes applying a matrix flattening operation to the matrix and generating a frequency domain representation of the image by applying a frequency domain transformation to the flattened matrix. The operation also includes generating a filter to apply to the frequency domain representation. The operation also includes applying the filter to the frequency domain representation to remove a portion of the frequency domain representation of the image. The operation also includes generating a reconstructed matrix from the filtered frequency domain representation, wherein a format of the reconstructed matrix is a format of the matrix representing pixels of the image. The operation also includes generating a reconstructed image of at least the portion of the form by applying an inverse frequency domain transformation to the reconstructed matrix filtered frequency domain representation, wherein the reconstructed image depicts only a portion of the content elements.

BRIEF DESCRIPTION OF THE DRAWINGS

Note, the appended drawings illustrate exemplary embodiments and are therefore not to be considered limiting of the scope of the disclosure, for the disclosure may admit to other equally effective embodiments.

FIG. 4A illustrates an example image of a form document, according to one embodiment.

FIG. 4B illustrates an example reconstructed image of a form document, according to one embodiment.

DETAILED DESCRIPTION

Figure 1:
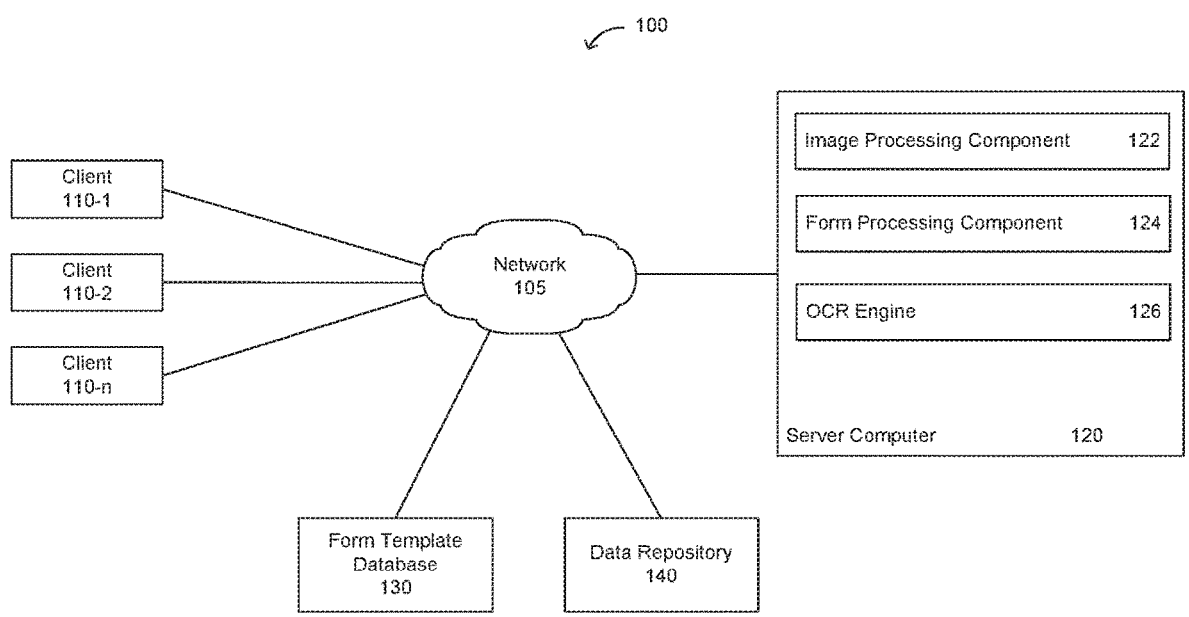
FIG. 1 illustrates an example computing environment, according to one embodiment.

Embodiments presented herein provide techniques for removing text from a form document without requiring any training data. More specifically, embodiments presented herein provide techniques for determining a filter to apply to spectral decomposition of an image to remove text from the image.

As described herein, an unsupervised learning approach is used to separate an image of a form document into content elements (e.g., text) and layout elements, such as lines defining areas (e.g., boxes) for text. Once separated, the content elements can be removed leaving only the layout elements, which may be used to reconstruct the image of the form without any text. Thereafter, the form document may be classified based on the layout so that a location of specific text on the form can be determined.

Current techniques to classify an image of a completed form (i.e., a form with text) involve computing a hash of the image. The image hash may then be compared to hashes computed based on a variety of forms, which may be stored in a database or the like. However, when the hash of the completed form is computed, the content (e.g., text) in the form changes the hash relative to a hash created from the same form without content (i.e., an empty form). Thus, accuracy of the hash technique is degraded when using completed form documents.

Furthermore, the content of the form document may include sensitive personal information that can be used to identify an individual associated with the form document. For example, a form document (such as a W-2) may include a social security number and an address of an individual. To protect the sensitive information during the classification process, the content of the form may be removed.

In one embodiment, the content elements of a form are removed, leaving only the layout elements (e.g., lines and boxes) of the form. Removing the content elements from the form increases the accuracy of classifying the form document. In some embodiments, the content elements are removed by a process using spectral decomposition, i.e., a decomposition based on frequency of certain elements in an image. Spectral decomposition may be applied to an image of a form to create a representation of the image elements (e.g., text and layout) using a group of frequencies. The frequencies of the decomposed image are filtered to remove one or more frequencies corresponding to text content while one or more frequencies corresponding to the layout elements of the image are retained.

In one embodiment, an image processing component may generate a two-dimensional (2D) array of pixels (i.e., a matrix) from an image of the form. The 2D array may represent an array of signals, where each row and each column represent a separate signal. For example, the array may comprise a value corresponding to each pixel of the image. The value for a given pixel may be '0' for a white pixel and '1' for a black pixel. Decimal values may be used to represent intermediate grayscale colors. The image processing component may apply a matrix flattening operation to reduce the 2D array to a one-dimensional (1D) array. The matrix flattening operation may concatenate each row of the 2D array resulting in a 1D array. For example, a 30×30 2D pixel image may be flattened to a 1D array of 1×900.

In one embodiment, the image processing component applies a spectral decomposition to the image of a form using a 1D Fast Fourier Transform (FFT) to produce a spectral domain representation of the image. That is, the image processing component computes the 1D FFT of the 1D array representing the pixels of the image. The frequencies from the spectral decomposition correspond to a frequency of changing pixel colors in the image. For example, a ten pixel row of "1100110011" has four changes of color, from black to white or white to black. Similarly, a ten pixel row of "1111100000" has one change of color. Thus, the first ten pixel row changes color more often resulting in a higher frequency than the second row.

Pixels corresponding to content elements, such as text, tend to be tightly grouped and have a high-frequency of color changes due to white space between text characters and white space within certain characters. By contrast, pixels corresponding to a layout element, such as a line or box around text, have a low-frequency of color change due to a long range of the layout feature across the form.

To remove high-frequency components from a spectral decomposition, an image processing component may apply a filter to the spectral domain representation of the image of the form. Removal of the high-frequency components from the spectral domain representation of the image may effectively remove the text from the image. The image processing component may determine an optimized filter to be applied to the spectral domain representation. The filter deemphasizes high spectral frequencies from the spectral domain representation while maintaining the low-frequency components. That is, the high-frequency portions of the spectral domain representation (e.g., that correspond to high-frequency changes in pixel color) are removed from the reconstructed image.

The filter to be applied to the spectral domain representation may be determined using linear programming methods. The solution of the linear programming problem yields the filter (i.e., mask function) to maximize a similarity measure between the signal of the image of the form and the signal of the reconstructed image while constraining the magnitude of the kth frequency component in the reconstruction. Thus, the image processing component determines a frequency to be used as a threshold for the spectral domain representation of the image of the form. Any frequency which exceeds the threshold frequency may correspond to content elements (e.g., text), and thus may be removed from the spectral domain representation by application of the filter.

Upon determining the filter that maximizes the similarity between the image of the form and the reconstructed image, the image processing component may apply the filter to the 1D FFT of the image of the form. The image processing component applies an inverse 1D FFT to the filtered spectral domain representation to generate the reconstructed image. The reconstructed image retains the low-frequency elements (i.e., the layout elements) from the image of the form, but does not include the high-frequency elements (i.e., content elements, such as text).

A form processing component may use the reconstructed image of the form to identify the form and to classify the form. For example, the image of the form may be identified by matching a known template of a form. The known template may be stored in a database of known templates. For example, the form processing component may identify the reconstructed image to be a W-2 form. Once identified, the form processing component may classify the form based on the identification.

Further, the image processing component may use the high-frequency components (i.e., content elements) removed from the spectral domain representation of the image to reconstruct the image of the form so that the reconstructed image includes the content elements. An OCR engine can be used to process text from a particular location on the image of the form. That is, once the form is identified, a form processing component may map the content elements of the form into fields of a known form template in a database. For example, a text field in the image of a form may correspond to a field in a known form template for "taxable wages." The OCR engine may process text in the reconstructed image, which includes high-frequency components from the spectral domain representation of the image.

If the reconstructed image cannot be identified, e.g., if the form processing component has not encountered this layout of a form before, the reconstructed form can be manually reviewed for classification without posing a security risk of exposing sensitive personal information because that personal information has been removed from the image of the form.

Note, embodiments described herein use tax forms, such as a W-2, as a reference example of forms having both layout elements and content elements. One of ordinary skill in the art will recognize that methods presented herein are equally applicable to a broad variety of form content or form types.

FIG. 1 illustrates an example computing environment 100, according to one embodiment. As shown, the computing environment 100 includes a network 105, one or more clients 110 (referred to individually as client 110-1, 110-2, . . . , 110-n), a server computer 120, a form template database 130, and a data repository 140. The network 105 may be representative of a Wide Area Network (WAN), such as a cellular network or the internet, a Local Area Network (LAN), such as an office network, or the like. As illustrated, the server computer 120 includes an image processing component 124, a form processing component 124, and an OCR engine 126.

The clients 110 may comprise a computing platform, such as a desktop computer, a laptop computer, a tablet, or a mobile device. In some embodiments, a client 110 may be used to capture a picture of a form. For example, the client 110 may include an image capture device, such as a camera, which can be used to capture an image of a form document. The client 110 may also include components to perform the various functions described herein.

The data repository 140 may comprise a database or other data storage mechanism. The data repository 140 may store one or more images of form documents and a corresponding layout of the one or more form documents.

The image processing component 122 is configured to receive an image from a client 110, data repository 140, or from a third-party over the network 105. A given image received by the image processing component 122 may depict a form document that includes content elements (e.g., text) and layout elements (e.g., lines and boxes). For example, the form document depicted in the given image may represent a W-2 tax form of an individual. The layout elements of the W-2 form may include lines and boxes demarcating fields for various data. The content elements may include the text (including letters and numbers) within the layout elements.

The image processing component 122 is configured to extract and remove the content elements from the image of the form document. To do so, the image processing component 122 generates a 2D array which represents pixels in the image of the form. The image processing component 122 may reduce the 2D array to a 1D array via a matrix flattening operation. For example, the image processing component 122 may concatenate each row of the 2D array to generate a 1D array. The image processing component 122 applies a spectral decomposition to the image of the form using a 1D FFT. The spectral decomposition results in a spectral domain representation of the image of the form.

The form processing component 124 receives the image of the form document with the content elements removed. For example, the form processing component 124 may receive a reconstructed image of the form document that depicts only the layout elements of the form document. The form processing component 124 may attempt to match the layout depicted in the reconstructed image to a known layout of a form, such as those stored in forms template database 130. For example, the form processing component 124 may identify the form document by comparing the layout of the form document in the reconstructed image to a layout of one or more known forms from the form template database 130. The form processing component 124 may then classify the form document based on the comparison.

Rather than receiving the reconstructed image, the form processing component 124 may receive the filtered spectral domain representation of the image of the form. In that case, the form template database 130 may store filtered spectral domain representations of each of the known forms. Thus, the form processing component 124 may compare the filtered spectral domain representation of the image of the form to one or more filtered spectral domain representations of known forms to try and find a matching known form.

Once a match is found, the form processing component 124 may classify the form and store data regarding the classification in the data repository 140. The form processing component 124 may determine a location of a particular content element in the original image of the form based on a location of a corresponding field in the matching known form. Thereafter, the form processing component 124 may map the particular content element to into the corresponding field of a known form template in the form template database 130.

If a matching layout is not found, the form processing component 124 may determine that the reconstructed image should be manually reviewed and classified. In this case, the form processing component may generate a message or other type of indication to alert a user of the need for manual review. Because the content elements are not included in the reconstructed image, the manual review does not pose a security risk of exposing sensitive personal information.

Once the filtered spectral domain representation of the image of the form is matched to a known form, the image processing component 122 may restore the high-frequency components (i.e., content elements) to the spectral domain representation of the image. The OCR engine 126, which is configured to detect and recognize text in images, may analyze the restored image to recognize text in the image of the form. Any recognized text data may by stored with the image file or in a data repository as associated with the image file. The generated and stored text data may later be searched by the server computer 120 and provided in response to queries. In some instances, rather than restoring the content elements to the reconstructed image, the OCR engine 126 may analyze the original image of the form document to recognize particular text in the original image. The generated text may likewise be stored in data repository 140 and searched by the server computer 120.

Form processing component 124 may be configured to match the layout in the reconstructed image to one or more known form templates from the form template database 130 using a variety of machine learning approaches. For example, a machine learning engine may be trained using form layout from the form template database 130, wherein each form template may include classification data for the fields and boxes in the particular form. The machine learning engine may further be trained by performing human review of a reconstructed image of a form and manual classification when the machine learning engine cannot identify a match. If the form processing component 124 cannot match the form layout in the reconstructed image to a layout of a form template using the machine learning algorithm, form processing component 124 may determine the reconstructed image needs manual review and classification. In such a case, form processing component 124 may mark or flag the reconstructed image and may generate a message or other type of indication to alert a user to the need for manual review.

In the case where manual review of a form is needed, the reconstructed image does not contain any sensitive personal information that can identify an individual because the content elements from the original image have been removed. Thus, there is no risk of exposing sensitive personal data depicted in the original image of the form. For example, when a form, such as a W-2 from an employer, requires review, that review may be completed without exposing the sensitive personal information in the original image of the form (such as social security number and wages) to a human reviewer.

Figure 2:
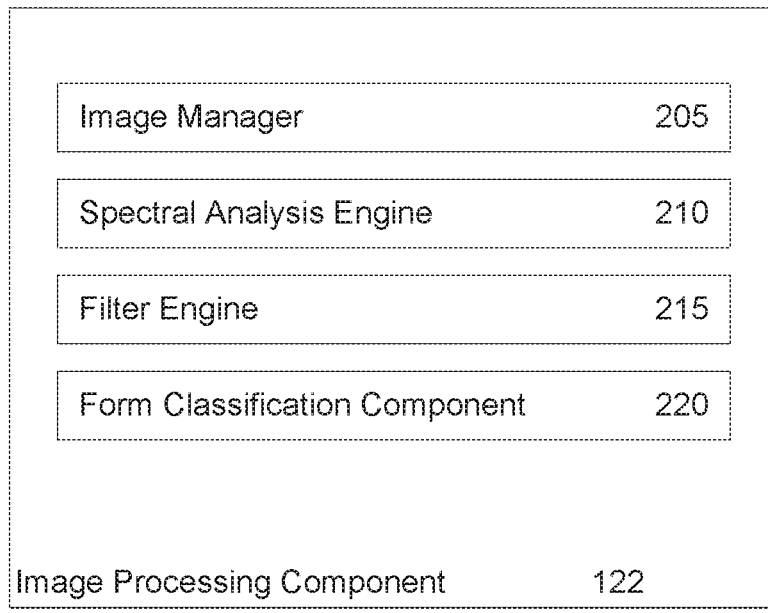
FIG. 2 illustrates an example image processing component, according to one embodiment.

FIG. 2 illustrates an example image processing component 122, according to one embodiment. As shown, the image processing component includes an image manager 205, a spectral analysis engine 210, and a filter engine 215. The image manager 205 receives an image from an external source. For example, the image manager 205 may receive an image from a client 110, as described with reference to FIG. 1, a third party, or the like. The received image may generally depict a form document and may include content elements (e.g., text) as well as layout elements (e.g., lines, boxes, etc.). For example, the image manager may receive an image of a tax form to be used with an online service for tax preparation.

Once received, the spectral analysis engine 210 may prepare the image for processing. For example, the spectral analysis engine 210 may generate a 2D array representing pixels of the image. Thereafter, the spectral analysis engine 210 may apply a matrix flattening operation to transform the 2D array to a 1D array. Once the image is prepared for processing, for example, after a flattened array representation of the image is generated, the spectral analysis engine 210 may apply spectral decomposition to the image using an FFT procedure. The output of the FFT procedure performed by the spectral analysis engine 210 is a spectral domain representation of the image.

In some embodiments, the spectral analysis engine 210 may apply a FFT procedure to an un-flattened array representation of the image, such as the 2D array of pixels generated initially by the spectral analysis engine 210. The spectral analysis engine 210 then applies the matrix flattening operation to the spectral domain representation of the image.

The filter engine 215 analyzes the spectral domain representation of the image to determine a filter to be applied to the image. High-frequency components of the spectral decomposition generally correspond to content elements of the form document while low-frequency components generally correspond to layout elements of the form. The filter, when applied to the image, removes the high-frequency components from the spectral decomposition.

In one embodiment, the filter engine 215 determines an appropriate filter by solving a linear programming problem. The linear programming problem is represented as:

$$R(f)=M(f)*S(f)$$

where S(f) is the spectral domain representation of the original signal s(t) determined from the image of the form; M(f) is the filter function (i.e., a mask function); and R(f) is the spectral domain representation of the reconstructed image.

Figure 3A:
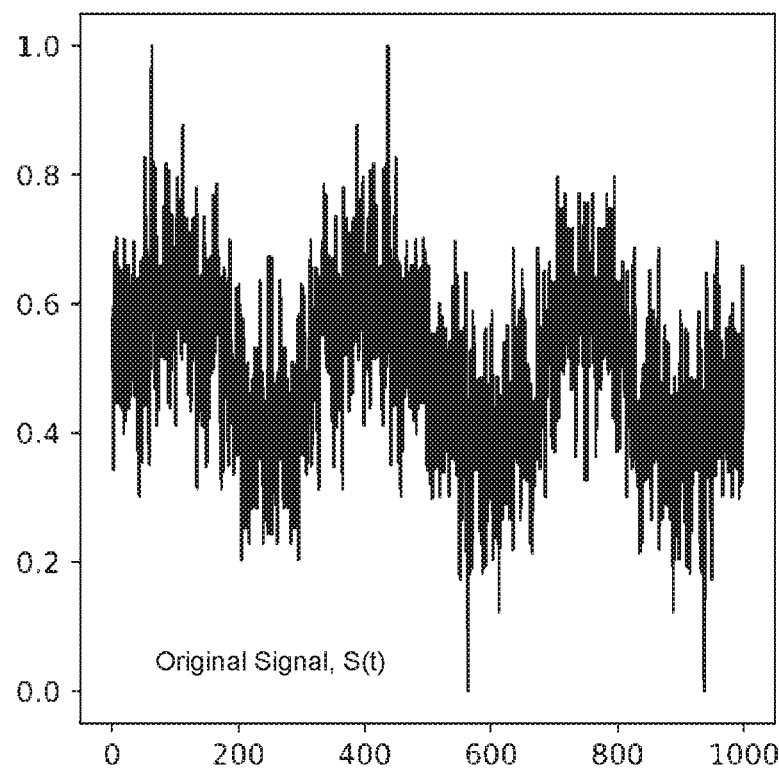
FIG. 3A illustrates an example signal corresponding to an image, according to one embodiment.

FIG. 3A illustrates an example signal of an image, e.g., S(t), according to one embodiment. The signal depicted in FIG. 3A is a 1 D analog of the flattened image array. The signal depicts a magnitude of the original signal S(t) of the image (e.g., the y-axis) for a given frequency (e.g., the x-axis).

Figure 3B:
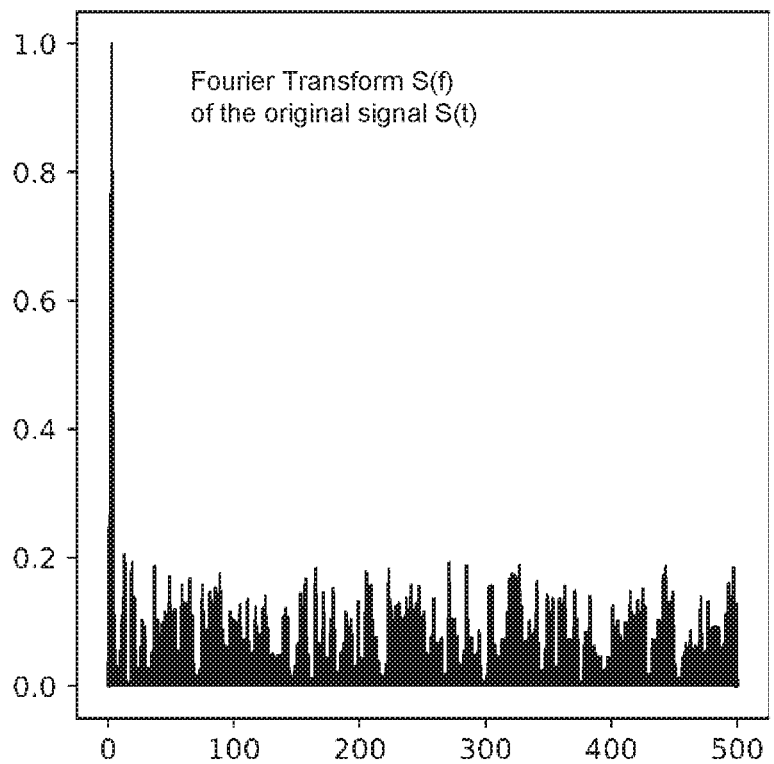
FIG. 3B illustrates an example spectral domain representation of the signal in FIG. 3A, according to one embodiment.

FIG. 3B illustrates an example spectral domain representation S(f) of the original signal S(t) shown in FIG. 3A. Solving the linear programming problem for M(f) provides the filter to be applied to the spectral domain representation of the image. FIG. 3B shows a magnitude of the spectral domain representation S(f) of the original signal S(t) (e.g., the y-axis) for a given frequency (e.g., the x-axis).

Figure 3C:
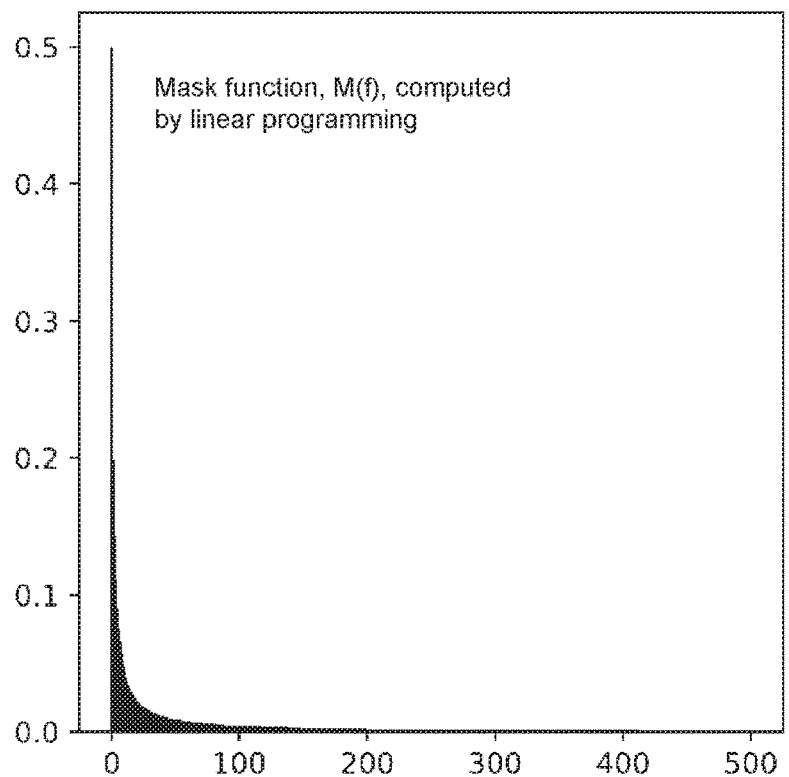
FIG. 3C illustrates an example filter determined using linear programming, according to one embodiment.

FIG. 3C illustrates an example filter or mask function M(f) (i.e., filter) determined using linear programming. The mask function M(f) depicted in FIG. 3C shows a magnitude of the mask function (e.g., the y-axis) at a given frequency (e.g., the x-axis). The mask function M(f) is applied to the spectral domain representation S(f) of the original signal S(t) by, for example, element-wise multiplication of the mask function M(f) and the spectral domain representation S(f). Applying the mask function M(f) removes one or more frequencies from the spectral domain representation S(f) at a frequency where the magnitude of the spectral domain representation S(f) exceeds the magnitude of the mask function M(f).

Figure 3D:
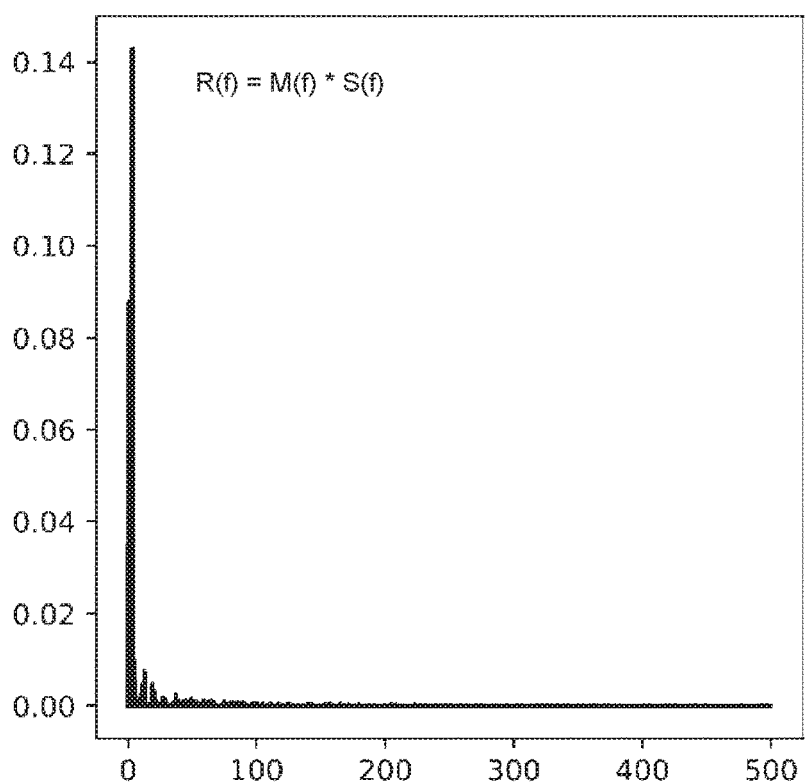
FIG. 3D illustrates an example spectral domain representation of a reconstructed signal of an image, according to one embodiment.

FIG. 3D illustrates an example spectral domain representation R(f) of a reconstructed signal of an image. As compared to S(f) in FIG. 3B, it is clear that the high-frequency components are removed from spectral domain representation R(f) of a reconstructed signal, as depicted in FIG. 3D, by operation of the mask function M(f). FIG. 3D depicts a magnitude of the spectral domain representation R(f) of a reconstructed signal of an image (e.g., the y-axis) at various frequencies (e.g., the x-axis).

The filter engine 215 generates a similarity measure $\rho(S,R)$ which indicates a similarity between the spectral domain representation S(f) of the original signal S(t) and the filtered signal R(f). The similarity measure $\rho(S,R)$, is defined as the dot product of the original signal S(f) and the filtered signal R(f):

$$\rho(S, R) = \sum_{k=0}^{N-1} S_k^* R_k = \sum_{k=0}^{N-1} S_k^*(M_k S_k) = \sum_{k=0}^{N-1} M_k |S_k|^2 = \sum_{k=0}^{N-1} M_k E_k = E^T M$$

where k is an index for each frequency; $S_k$ and $R_k$ refer to S(f) and R(f), respectively, at a given frequency, k; $E_k = |S_k|^2$, which is the squared magnitude of the kth Fourier component; $S_k$ is the kth Fourier component of the original signal $s_t$ and $E^T$ is the transpose of $E_k$. The original signal S(t) is represented as:

$$S_t = \frac{1}{N} \sum_{p=0}^{N-1} s_p e^{-i2\pi tk/N}$$

The filter engine 215 determines the filter by maximizing the similarity measure $\rho(S,R)$ while constraining the magnitude of the kth frequency component of the filtered signal R(f). That is, the filter engine 215 maximizes the similarity measure:

$$E^T M$$

while the mask function (i.e., filter) M is subject to $$M_k \geq 0 \forall k$$

$$M_k \leq C_k, \ 1 \leq k \leq N$$

where $C_k$ is a high-frequency budget coefficient, which constrains the magnitude of the filter $M_k$ for the kth frequency component. The budget coefficients provide the rate of decay of the filter as frequency increases. That is, the budget coefficients are optimized to provide a smooth decay of the mask function (i.e., filter) as frequency increases, as shown in FIG. 3C. The budget coefficients may be optimized to provide a smooth filter shape. The budget coefficients can be a monotonically decreasing function of the frequency, k. For example, the budget coefficients may be defined as one of the following:

$$C_k = e^{-\alpha k}$$

$$C_k = \frac{1}{1+k^2}$$

$$C_k = \frac{1}{1+2k}$$

where $\alpha$ is an exponential smoothing parameter for the filter.

Note, the above 1D example is provided to describe the process of the linear programming problem. However, one skilled in the art will recognize that this problem can be applied to a 2D problem where the budget coefficients are determined by one of the following:

$$C_{kl} = e^{-\alpha kl}$$

$$C_{kl} = \frac{1}{k^2 + l^2}$$

Once the filter is determined, the filter engine 215 applies the filter by multiplying the spectral domain representation of the image and the filter function. In the embodiments depicted with respect to FIGS. 3A-3D, the filtered signal R(f) retains the low-frequency components of spectral domain representation of the form S(f) while the high-frequency components are minimized or eliminated by application of the mask function M(f) (i.e., filter).

Figure 3E:
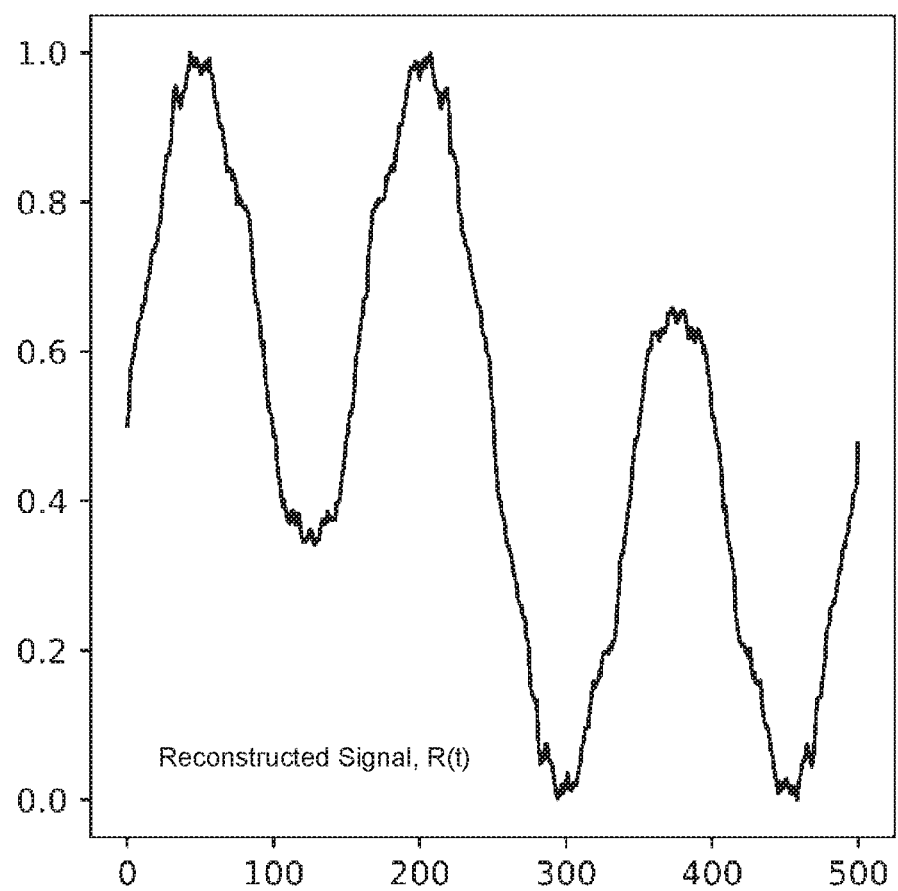
FIG. 3E illustrates an example reconstructed signal with high-frequency components removed, according to one embodiment.

Once the filter is applied, the spectral analysis engine 210 generates a reconstructed signal R(t), as depicted in FIG. 3E, from the filtered signal R(f). The reconstructed signal R(t) may be used to create a reconstructed image of the form with the high-frequency components removed from the form.

For example, the spectral analysis engine 210 may create a reconstructed signal R(t) by computing an inverse FFT of the filtered signal R(f). FIG. 3E illustrates an example reconstructed signal R(t) of a filtered spectral domain representation of an image. As depicted in FIG. 3E, the reconstructed signal R(t) retains the low-frequency components of the original image signal S(t), while the high-frequency components have been removed from the reconstructed signal by application of the mask function M(f) (i.e., filter). Because the high-frequency components are removed by application of the mask function M(f) (i.e., filter), the mask function M(f) (i.e., filter) may be referred to as a low-pass filter (i.e., a filter which passes signals with a frequency lower than a certain cutoff frequency and which attenuates signals with frequencies higher than the cutoff frequency). The signal depicts a magnitude of the reconstructed signal R(t) (e.g., the y-axis) at various frequencies (e.g., the x-axis).

While certain embodiments described herein discuss application of a mask function (i.e., a filter) M(f), that acts as a low-pass filter to an image, one skilled in the art will recognize that the mask function M(f) may also be configured to act as a high-pass filter (i.e., a filter which passes signals with a frequency higher than a certain cutoff frequency and which attenuates signals with frequencies lower than the cutoff frequency), or a band-pass filter (i.e., a filter which passes signals within a frequency band and which attenuates signals with frequencies outside the frequency band). For example, a reconstructed image generated from a low-pass filtered spectral domain representation contains the layout elements with the content elements removed, while a reconstructed image generated from a high-pass filtered spectral domain representation contains the content elements with the layout elements removed.

In one embodiment, the image processing component 122 subdivides one or more received images into a plurality of sub-images. The spectral analysis engine 210 may generate a spectral domain representation of each sub-image using the methods described, above. Filter engine 215 may generate and apply a filter to the spectral domain representation of each sub-image. In some embodiments, filter engine 215 may apply different filters to spectral domain representations of different sub-images. Applying a filter to the sub-images may improve clarity of layout elements in the reconstructed image generated from the sub-image spectral domains. Image manager 205 may combine the reconstructed sub-images to create a reconstructed composite image of the original image.

Figures 4A, 4B:
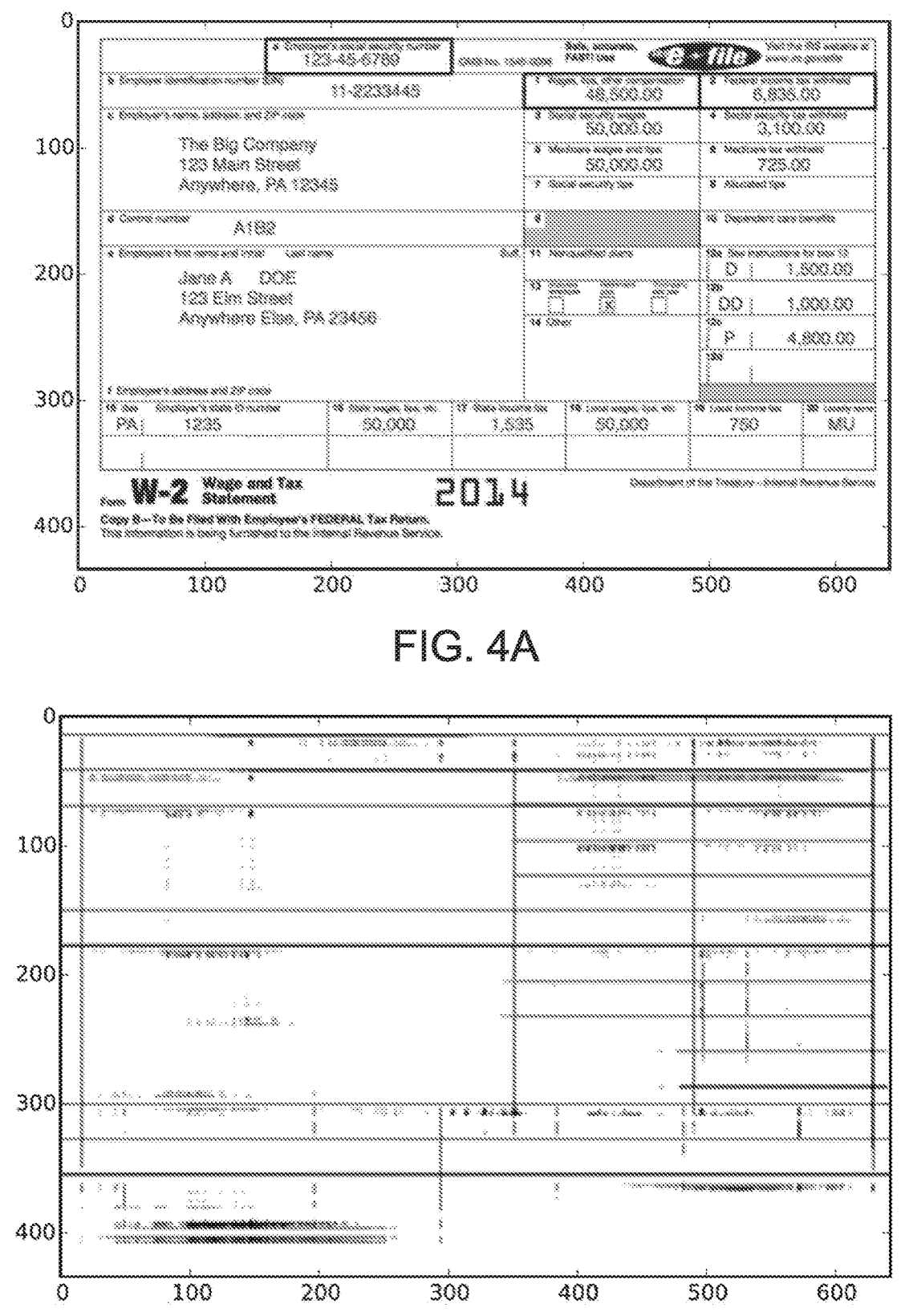

FIG. 4A depicts an example image of a form document. As shown, the form document includes layout elements (e.g., lines and boxes) and content elements (e.g., text). The layout elements of the form generally correspond to low-frequency components in a spectral domain representation of the image while the content elements generally correspond to high-frequency components. The example image of a form document as depicted in FIG. 4A may be representative of an image received by the image manager 205 as described with reference to FIG. 2.

FIG. 4B illustrates an example reconstructed image of a form document. As shown, the reconstructed image retains the layout elements, while the content elements are removed or blurred. That is, the low-frequency components from spectral domain representation of the original image are maintained while the high-frequency components are removed completely or blurred.

The reconstructed image may be transmitted to the form processing 124 component to identify the layout of the form in the image and extract text from the image of the form. To identify the form, the layout of the form may be compared to one or more layouts of known forms stored in a database. The form in the image may be classified based on the comparison.

In one embodiment, an OCR engine may be used to check the effectiveness of the filter applied to the original image. For example, the OCR engine may analyze the reconstructed image, such as depicted in FIG. 4B. If the OCR engine does not detect any recognizable text in the reconstructed image, then it may be determined that the filter effectively removed or blurred the content elements in the original image. However, if the OCR engine does recognize text, then it may be determined that the filter did not effectively remove or blur the text from the original image. In that case, an amount of text or a number of characters recognized by the OCR engine may be used to refine the filter by increasing the magnitude of the filter to remove the recognized text from the reconstructed image. That is, the amount of text recognized by the OCR engine may be used to adjust parameters of the filter.

By using the OCR engine to determine an effectiveness of the filter applied to a spectral domain representation of an image of a form, once a layout of the form is identified, a filter engine can determine a form-specific filter to apply to the spectral domain representation to generate a more accurate reconstructed image. That is, the form-specific filter may remove more text than the first filter, and thus create a better reconstructed image with less text or blurred text remaining in the reconstructed image.

In some embodiments, the reconstructed image of a form document, as shown in FIG. 4B, may be representative of an image generated by filtering a spectral domain representation of an image of a form. The reconstructed image may be used to identify a layout of the form and to classify the form. Classifying the form may improve an OCR process to detect and recognize text in the image of the form. For example, the OCR engine may determine a location of a particular text element in the form based on a matching template of that form.

Figure 5:
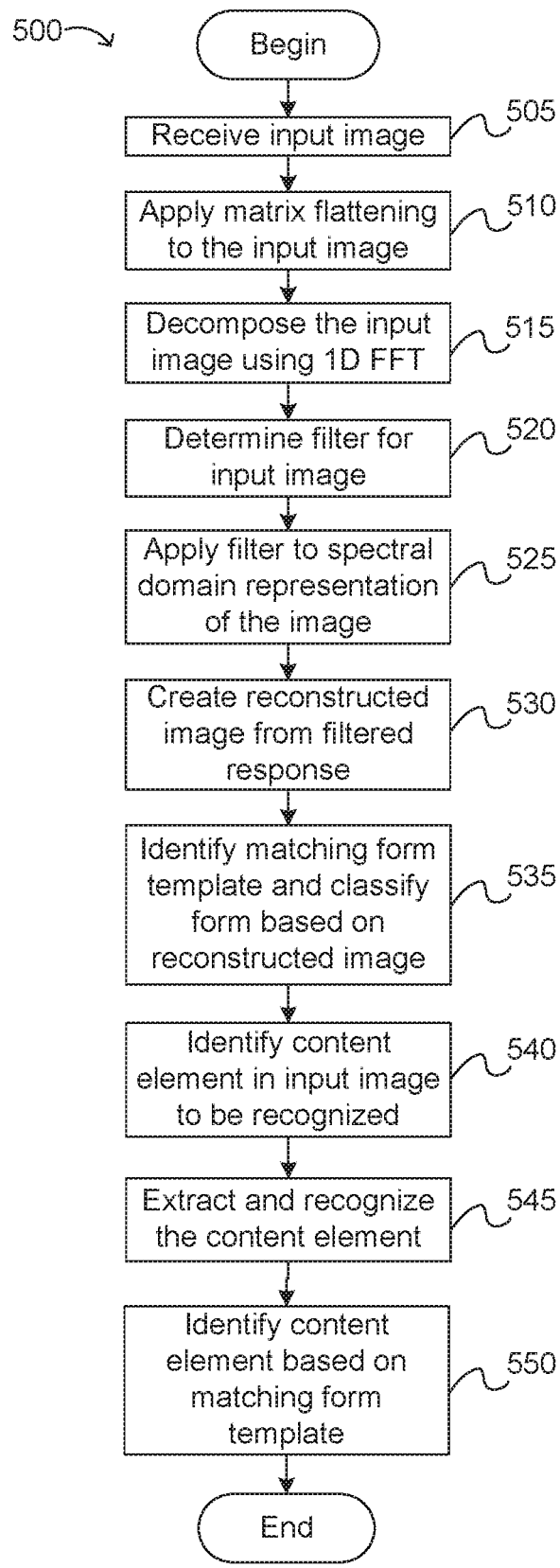
FIG. 5 illustrates an example method for removing text from a form document, according to one embodiment.

FIG. 5 illustrates an example method for removing text from a form document, according to one embodiment. As shown, the method 500 begins at step 505 where an image processing component receives an input image. The input image generally depicts a form document, which includes both layout elements and content elements. The layout elements may include lines and boxes. The content elements may include text or symbols.

At step 510, the image processing component generates a 2D array based on the pixels in the original input image and applies a matrix flattening operation to the array. The 2D array may include a value for each pixel in the input image. For example, a black pixel in the input image may correspond to a '1' in the array while a white pixel in the input image may correspond to a '0' in the array. Where the input image includes colors or gradients of grey, the value of the pixel may be between 0 and 1, or may be rounded to 0 or 1 based on the intensity of the pixel. The matrix flattening operation may concatenate each row of the 2D array to form a 1D matrix. Thus, the 2D array may be "flattened" to a 1D array.

At step 515, the image processing component applies spectral decomposition to the 1D array to create a spectral domain representation of the input image. To do so, the image processing component computes an FFT of the 1D array.

At step 520, the image processing component determines a filter to be applied to the spectral domain representation of the input image. To determine the filter, the image processing component uses a linear programming method. For example, a linear programming method may be used to create a filter that removes the high-frequency components of the spectral domain representation of the input image. To do so, the image processing component determines a plurality of budget coefficients, e.g., one budget coefficient for each frequency or frequency band in the spectral domain representation of the input image. The budget coefficients represent a limit for the filter at each frequency or in each frequency band and may be determined according to a monotonically decreasing function.

At step 525, the image processing component applies the filter to the spectral domain representation of the input image to remove the high-frequency components, which may correspond to the content elements in the input image.

At step 530, the image processing component creates a reconstructed image from the filtered spectral domain representation of the input image of the form. To do so, the image processing component computes an inverse FFT of the filtered spectral domain representation of the input image. The inverse FFT results in a 1D array which represents the pixels of the reconstructed image. Thus, the image processing component may decompose the 1D array into a matrix (e.g., a 2D array) that is the same size as the original image.

For example, the original input image of the form may be a 30×30 pixel image, which may correspond to a 30×30 element matrix. The 30×30 matrix may be flattened into a 1D array of 1×900 elements. When reconstructing an image from the filtered signal, the image processing component may form a plurality of 30 element rows from the 1×900 element 1D array to form a new matrix in a 30×30 element configuration, which matches the original input image format. Once the reconstructed image is complete, a layout of the form in the reconstructed image may be identified by a form processing component.

At step 535, a form processing component identifies a form template, in a form template database, that matches the layout depicted in the reconstructed image. Once a matching form template is identified, the form processing component classifies the form depicted in the input image. For example, if the matching form template is a W-2 tax form, the form in the input image may be classified as a W-2. If a matching form template cannot be found, the form processing component may generate an alert to inform a user of the need for manual review of the reconstructed image.

At step 540, the form processing component identifies a particular content element to be recognized by an OCR engine. For example, the form processing component may receive a request to extract text from a particular location in the input image of the form. The form processing component may also identify a layout element associated with the content element to be recognized. For example, the form processing component may identify a field or box in the layout of the form that surrounds or encloses the content element to be recognized.

At step 545, an OCR engine extracts and recognizes the content element in the form. The OCR engine may store the recognized text in a data repository. The stored text may be used by an application. The data repository may also store the input image and the reconstructed image.

At step 550, the form processing component may identify a location in the image of the form of the layout element corresponding to the extracted content element. The form processing component may use that location to classify the extracted content element based on a field in the matching form template. For example, the form processing component may determine that a location of the layout element, in the image of the form, corresponding to the extracted content element is the same as a location as a field for a social security number in the matching known form template. Thus, the form processing component may classify the extracted content element as a social security number. In one embodiment, the form processing component may map the extracted content element into the corresponding filed in the matching form template. The classification may be stored in the data repository with the extracted content element.

As disclosed above, method 500 may improve the operation of a device implementing the method in several aspects. First, the use of filters to remove content elements from an input image while preserving layout elements in the input image improves the performance of the subsequent pattern matching and classification of the type of form shown in an input image. Thus, a system implementing method 500 (and similar methods) may perform the matching of template forms to processed input images more quickly and with fewer computing resources expended as a consequence of the speed improvement. Further, the amount of processing resources and memory necessary to perform the matching may be decreased by virtue of the filtering of the input image to include less information that must be processed (e.g., by removing content elements that would otherwise have to be distinguished from layout elements). Further yet, a device implementing method 500 (and similar methods) may improve the accuracy and speed of optical character recognition (OCR) because content elements may be distinguished from layout elements via the filtering steps. Further, because the OCR need only focus on known content elements (again by virtue of the filtering), the OCR may be implemented in a more limited and targeted fashion, e.g., only targeting a particular content area based on a known layout of the form. This in and of itself can reduce processor and memory usage of the device implementing the method. Additionally, the performance of the filtering steps performed by a device implementing method 500 may be improved by the ability to provide automatic, closed-loop-type feedback (e.g., via the results of the OCR steps). For these reasons and others, a device implementing method 500 may perform faster and with fewer processing and memory resources necessary. Similarly, the method 500 itself will perform better than known methods for the reasons described above.

Figure 6:
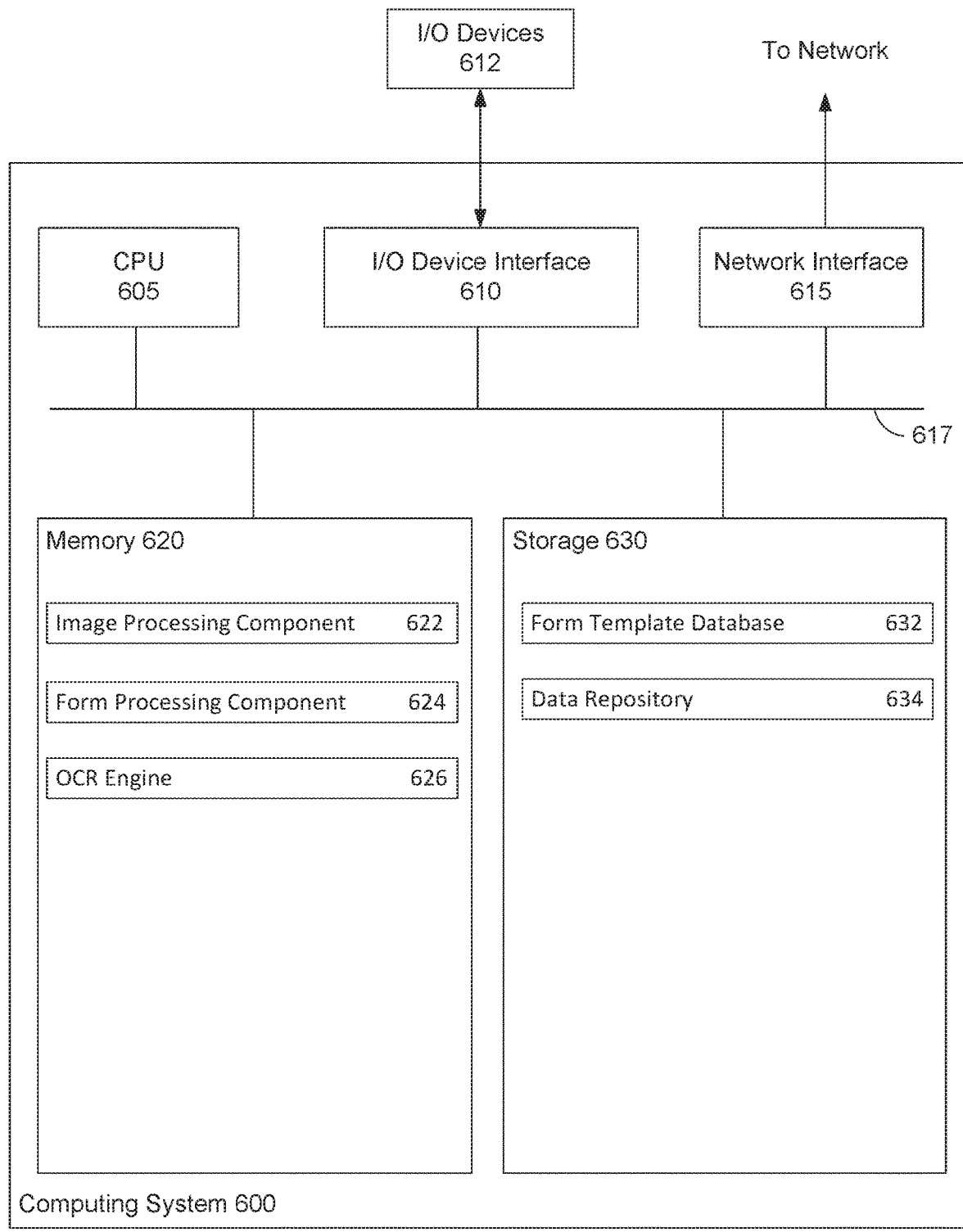
FIG. 6 illustrates an example computing system configured to remove content elements from an image of a form document, according to one embodiment.

FIG. 6 illustrates an example computing system 600 configured to implement the methods of image processing disclosed herein. As shown, the computing system 600 includes a central processing unit (CPU) 605, a network interface 615, a memory 620, and storage 630, each connected to a bus 617. The computing system 600 may also include an I/O device interface 610 connecting I/O devices 612 (e.g., keyboard, display, mouse devices, image capture devices, etc.) to the computing system 600. Further, the computing elements shown in the computing system 600 may correspond to a physical computing system (e.g., a system in a data center) or may be a virtual computing instance executing within a computing cloud.

The CPU 605 retrieves and executes programming instructions stored in the memory 620 as well as stored in the storage 630. The bus 617 is used to transmit programming instructions and application data between the CPU 605, I/O device interface 610, storage 630, network interface 615, and memory 620. Note, CPU 605 is included to be representative of a single CPU, multiple CPUs, a single CPU having multiple processing cores, and the like, and the memory 620 is generally included to be representative of a random access memory. The storage 630 may be a disk drive or flash storage device. Although shown as a single unit, the storage 630 may be a combination of fixed and/or removable storage devices, such as fixed disc drives, removable memory cards, optical storage, network attached storage (NAS), or a storage area-network (SAN).

As shown, storage 630 includes a form template database 632 and a data repository 634. The form template database 632 may include a layout of one or more known forms. Illustratively, the memory 620 includes an image processing component 622, a form processing component 624, and an OCR engine 626. The image processing component 622 is configured to receive an image of a form document and remove content elements from the form. The image of the form document generally includes layout elements and content elements. As an example, the layout elements may include lines and boxes while the content elements may include text.

The content elements in an image of a form document are typically tightly grouped together with a high-frequency in color changes from one pixel of the image to the next. For example, a line of pixels within a line of text includes a high-frequency of color changes from black to white pixels or white to black pixels due the white space between each character and the white space within the characters. In contrast, a line of pixels in a layout element, such as a box, has a low-frequency of color changes.

The image processing component 622 applies a spectral decomposition, i.e., a decomposition based on frequency, to the image. The spectral decomposition is applied using a FFT and results in a spectral domain representation of the image. Once the spectral decomposition is applied, the image processing component 622 determines a filter to be applied to the spectral domain representation of the image.

The image processing component 622 may apply a matrix flattening operation to reduce a 2D matrix of the image to a 1D array. For example, a size of the resulting 2D matrix may be the same as a size of the image, e.g., 30×30. In that case, the image processing component may apply a matrix flattening operation to concatenate each row of the 30×30 matrix, resulting in a 1×900 1D array.

The filter may be determined by solving a linear programming problem to maximize a similarity measure between the image of the form and a reconstructed image of the form with the high-frequency components removed. That is, the image processing component 622 solves an optimization problem to ensure that each frequency component of the reconstructed signal is as close to possible to the corresponding frequency component of the spectral domain representation of the image.

Once the filter is determined, the image processing component 622 applies the filter to the spectral domain representation of the image, e.g., by element-wise multiplication of the filter function and the image signal. The image processing component 622 creates a reconstructed image of the form using the filtered spectral domain representation of the image. The reconstructed image maintains the layout elements of the image of the form while deemphasizing and removing the content elements.

Once the reconstructed image is generated, the form processing component 624 may identify the form by comparing the layout in the reconstructed image to one or more layout of known forms in the form template database. That is, the form processing component 624 attempts to match the layout in the reconstructed image to a layout of a known form in the form template database 632.

Once the form is identified, the OCR engine may analyze a particular collection of text on the original image of the form. For example, the form processing component 624 may map the content elements of the form into fields of a known form template. For example, a text field in the image of the form may correspond to a filed in a known form template for "social security number." The OCR engine may process that text field in the reconstructed image to determine the text content of that field.

The processed text may be stored in the data repository 634 to be used by an application. The data repository may also store one or more images of form documents and corresponding reconstructed images.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for removing text from an image of a form comprising:
   generating a matrix representing pixels of the image, wherein the image depicts at least a portion of the form, and wherein the form includes layout elements and content elements;
   applying a matrix flattening operation to the matrix;
   generating a frequency domain representation of the image by applying a frequency domain transformation to the flattened matrix;
   generating a filter to apply to the frequency domain representation;
   applying the filter to the frequency domain representation to remove a portion of the frequency domain representation of the image;

generating a reconstructed matrix from the filtered frequency domain representation, wherein a format of the reconstructed matrix is a format of the matrix representing pixels of the image;
generating a reconstructed image of at least the portion of the form by applying an inverse frequency domain transformation to the reconstructed matrix filtered frequency domain representation, wherein the reconstructed image depicts only a portion of the content elements;
matching the reconstructed image to a form template;
generating respective text from the content elements of the image; and
mapping portions of the respective text to a corresponding field of the form template based on a position of the content element in the image.

2. The method of claim 1, wherein the reconstructed image is matched to the form template by comparing the reconstructed image to each of a plurality of form templates until the matching form template is found.

3. The method of claim 1, wherein the filter comprises a low-pass filter.

4. The method of claim 1, wherein the frequency domain transformation is a discrete Fast Fourier Transform.

5. The method of claim 1, wherein the content elements of the form include text.

6. The method of claim 1, wherein generating the filter comprises maximizing a similarity measure between the image and the reconstructed image.

7. The method of claim 6, wherein the similarity measure is a dot product of the frequency domain representation of the image and the reconstructed image.

8. A non-transitory computer-readable medium storing instructions which, when executed by one or more processors, performs an operation for removing text from an image of a form, the operation comprising:
applying a matrix flattening operation to the matrix;
generating a frequency domain representation of the image by applying a frequency domain transformation to the flattened matrix;
generating a filter to apply to the frequency domain representation;
applying the filter to the frequency domain representation to remove a portion of the frequency domain representation of the image;
generating a reconstructed matrix from the filtered frequency domain representation, wherein a format of the reconstructed matrix is a format of the matrix representing pixels of the image;
generating a reconstructed image of at least the portion of the form by applying an inverse frequency domain transformation to the reconstructed matrix filtered frequency domain representation, wherein the reconstructed image depicts only a portion of the content elements;
matching the reconstructed image to a form template;
generating respective text from the content elements of the image; and
mapping portions of the respective text to a corresponding field of the form template based on a position of the content element in the image.

9. The non-transitory computer-readable medium of claim 8, wherein generating the filter comprises maximizing a similarity measure between the image and the reconstructed image.

10. The non-transitory computer-readable medium of claim 9, wherein the similarity measure is a dot product of the frequency domain representation of the image and the reconstructed image.

11. The non-transitory computer-readable medium of claim 8, wherein the two dimensional frequency domain transformation is a two dimensional discrete Fourier transform.

12. The non-transitory computer-readable medium of claim 8, wherein the reconstructed image is matched to the form template by comparing the reconstructed image to each of a plurality of form templates until the matching form template is found.

13. A system, comprising:
a processor; and
memory hosting an application, which, when executed on the processor, performs an operation for removing text from an image of a form, the operation comprising:
applying a matrix flattening operation to a matrix to produce a flattened matrix;
generating a frequency domain representation of the image by applying a frequency domain transformation to the flattened matrix;
generating a filter to apply to the frequency domain representation;
applying the filter to the frequency domain representation to remove a portion of the frequency domain representation of the image;
generating a reconstructed matrix from the filtered frequency domain representation, wherein a format of the reconstructed matrix is a format of the matrix representing pixels of the image;
generating a reconstructed image of at least the portion of the form by applying an inverse frequency domain transformation to the reconstructed matrix filtered frequency domain representation, wherein the reconstructed image depicts only a portion of the content elements;
matching the reconstructed image to a form template;
generating text from the content elements of the image; and
mapping portions of the text to a corresponding field of the form template based on a position of the content element in the image.

14. The system of claim 13, wherein generating the filter comprises maximizing a similarity measure between the image and the reconstructed image.

15. The system of claim 14, wherein the similarity measure is a dot product of the frequency domain representation of the image and the reconstructed image.

16. The system of claim 13, wherein the two dimensional frequency domain transformation is a two dimensional discrete Fourier transform.

17. The system of claim 13, wherein the reconstructed image is matched to the form template by comparing the reconstructed image to each of a plurality of form templates until the matching form template is found.

18. The system of claim 13, wherein the filter comprises a low-pass filter.

19. The system of claim 13, wherein the content elements of the form include text.

20. The non-transitory computer-readable medium of claim 8, wherein the filter comprises a low-pass filter.

* * * * *